Figure 1:
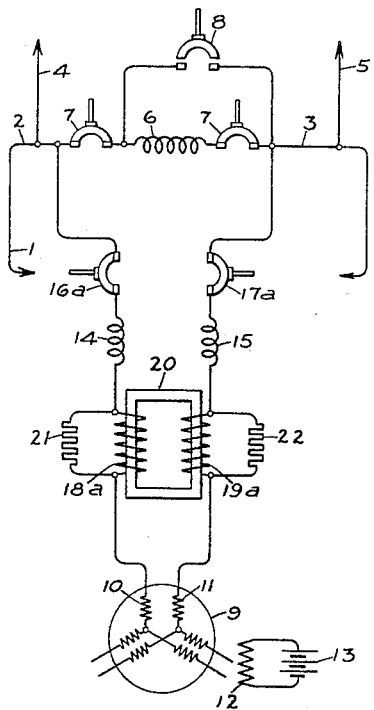

Aug. 1, 1933.　　　　L. H. PERRY　　　　1,920,804

SYSTEM OF DISTRIBUTION

Filed Nov. 19, 1931

Inventor:
Leo H. Perry,
by Charles E. Tullar
His Attorney.

Patented Aug. 1, 1933

1,920,804

UNITED STATES PATENT OFFICE 1,920,804

SYSTEM OF DISTRIBUTION

Leo H. Perry, Schenectady, N. Y., assignor to General Electric Company, a Corporation of New York Application November 19, 1931
Serial No. 576,132

10 Claims. (Cl. 171—97)

My invention relates to systems of electrical distribution and more particularly to busbar systems and systems of connections for central generating stations and substations of alternating current distribution systems.

The present tendency in power generation, toward larger central stations with larger generating units, has brought about an intensive study of the problem of improving the power control and stability of systems of distribution. In the solution of this problem an arrangement which has been found to be satisfactory in practice is described and claimed in United States Letters Patent 1,815,823, granted on an application of Theophilus F. Barton. In this arrangement each generator is provided with two or more separately insulated windings normally connected to supply energy to different bus sections so that the power of a single generating unit is not concentrated on a single bus section.

An arrangement to increase the reliability of service and to protect against short circuits in a system of distribution utilizing multiple winding generators has been described and claimed in United States Letters Patent No. 1,852,803, granted April 5, 1932 upon an application of Frazer W. Gay. In this arrangement the circuits of a multiple winding generator are connected in series with a differential reactor or balancing transformer in such a manner as to equalize the currents in the different generating circuits connected to supply energy to a system of distribution.

In a system of distribution utilizing multiple winding generators and differential reactors it is desirable to protect the windings of the differential reactors and switches associated therewith from high induced voltages, upon the occasion of faults or short circuits, or conditions of operation in which a particular generating circuit is isolated while the remaining generating circuits of the same machine continue to supply energy to the buses. With a predetermined ratio or division of the currents of the generating circuits the resultant flux of the reactor is substantially zero. When a particular generating circuit is isolated, however, the current flowing through the windings of the reactor associated with the remaining generating circuits becomes highly magnetizing and a high voltage is induced in the open circuited reactor coils associated with the isolated generating circuit. Similarly, if the switches on the respective circuits of a double-winding generator do not open simultaneously on a short circuit, a high voltage will be generated across the windings of the differential reactor making it difficult for the first switch in the sequence of opening to clear. As it is desirable, for the purposes of economy, to have the differential reactor physically small as compared with the generator associated therewith, the high induced voltage in the open circuited reactor windings will tend to subject the insulation of the windings to excessive voltage strains and at the same time increase the peak of the voltage wave across the contacts of the switch which opens first during the period of interruption following a short circuit.

It is an object of my invention to provide an improved arrangement for limiting to a safe value voltages induced in the windings of inductive means such as differential reactors or balancing transformer utilized in electrical systems of distribution.

Another object of my invention is to provide a protective arrangement for balancing transformers or differential reactors utilized with multiple winding generators for limiting to a safe value the voltages induced in the windings of the transformer or reactor due to faults or short circuits in the bus or feeder circuits, or due to the isolation of a particular generating circuit while the remaining circuits of the same machine continue to supply energy to the system of distribution.

Figure 2:
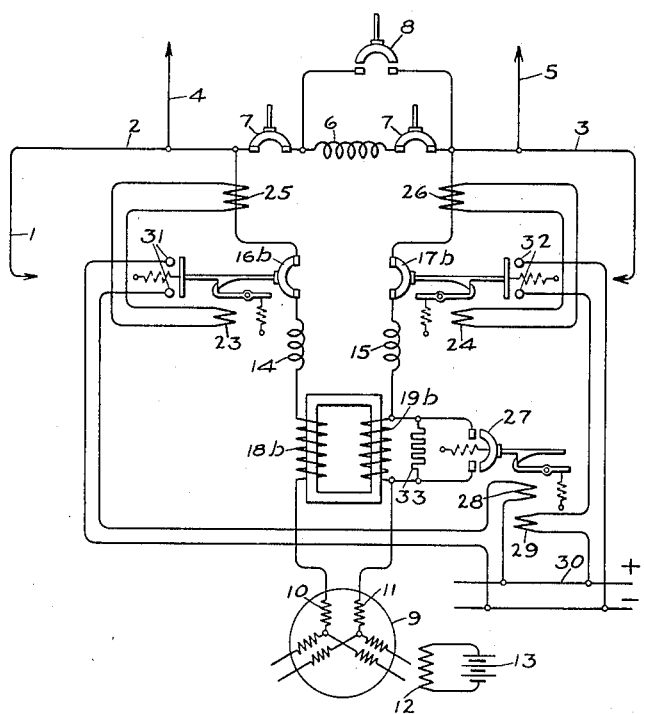

The novel features which I believe to be characteristic of my invention are set forth with particularity in the appended claims, the invention itself, however, both as to organization and method of operation together with further objects and advantages thereof will be better understood by reference to the following description taken in connection with the accompanying drawing in which Fig. 1 is a diagrammatic illustration of an embodiment of my invention for a balancing transformer utilized with a double winding generator and Fig. 2 is a modification of the embodiment shown in Fig. 1.

Referring to Fig. 1 of the drawing, 1 indicates a portion of a power station bus which may be of the ring or chain type in a single or duplicate busbar system. For purposes of simplicity a one line diagrammatic representation has been used to illustrate all of the circuits except the armature and field windings in Fig. 1, and the control circuits and armature and field windings in Fig. 2. The bus 1 may comprise any number of sections but for purposes of illustration I have shown only two sections designated as 2 and 3.

A large number of feeder circuits may be arranged to be supplied from each bus section and by way of example single feeder circuits 4 and 5 are shown connected to the bus sections 2 and 3 respectively. In this instance the power transfer along the bus is obtained by means of a bus reactor and the bus sections have interposed therebetween a reactor 6 with a switch 7 on each side thereof in accordance with the known practice, and a by-pass switch 8 which controls a circuit in shunt to the reactor 6 and switch 7, to permit direct interconnection of the two buses. Under usual conditions of operation the switches 7 are maintained in a circuit closing position and the switch 8 is maintained in a circuit interrupting position so as to limit the power which can flow along the bus sections from one side of the reactor to the other, and thereby limit the amount of current which would flow from all units connected to the bus into a fault on a given section. These switches are shown very diagrammatically and may be of any suitable type, such for example, as various types of oil switches well known in the art.

A multiple winding generator 9 having a plurality of separately insulated armature circuits is connected to energize the main bus 1 in such a manner that each separately insulated circuit of the same generator is connected to a different bus section. Any number of generators may be connected to the bus 1 but for purposes of illustration I have shown only the one generator 9. The alternating current generator is diagrammatically illustrated as a double winding generator although it will occur to those skilled in the art that arrangements may be provided for a generator having more than two windings without departing from my invention in its broader aspects. As shown, generator 9 comprises two separately insulated stator windings 10 and 11, and an excitation winding 12 which is energized by a suitable source of current, diagrammatically illustrated as a battery 13. The winding 10 is connected to the bus 2 through an inductive device 14, such for example as the usual generator reactor shown. The winding 11 is connected through a similar inductive device 15 to the bus section 3. Suitable switches 16a and 17a for example, of the usual type of oil switch, are interposed between the buses 2 and 3 and inductive devices 14 and 15, respectively. The switches 16a and 17a are provided to interrupt the circuit through the generator winding associated therewith upon the occasion of a fault or short circuit, or to isolate a particular generator winding or generator whenever it is found desirable or necessary.

A differential reactor or balancing transformer is connected in series with the generator windings for inductively coupling the separate circuits of the generator to equalize the currents in the different generating circuits. This differential reactor is interposed between the inductive devices 14 and 15 and the generator windings 10 and 11, respectively, and comprises a coil 18a connected in series relation with the generator winding 10 and a coil 19a connected in series relation with the generator winding 11. The coils 18a and 19a are placed in inductive relation with high mutual coupling and so arranged that for a predetermined ratio or division of current and a common power factor between the two generator windings the magnetomotive force of one of the coils will be equal and opposite to the magnetomotive force of the other coil. The coils may be arranged in inductive relation with an air core, or with an iron core 20 as illustrated in the drawing. With close mutual coupling of the coils 18a and 19a, the mutual leakage loss is very low so that the reactor offers a minimum impedance to a predetermined ratio of the currents, and when the current traversing one winding tends to become greater than the current traversing the other winding the reactor will effectively equalize the currents in the two generator windings. Thus, if the load on the bus section 3 tends to become greater than the load on the bus section 2, the voltage of the bus section 3 will be decreased by the impedance voltage component across the coil 19a, which is opposed to the voltage generated in the winding 11. At the same time there is an impedance voltage across the coil 18a which is in a direction to add to the voltage of the generator winding 10. The voltage of the bus section 3 is therefore decreased and the voltage of the bus section 2 is increased so that part of the increased load on the bus 3 is supplied by the bus 2 through the bus reactor 6. In this manner the winding 11 will drop load and the winding 10 pick up load to equalize the current and power between the windings.

In accordance with my invention I provide impedance means, having a negative impedance-voltage characteristic in which the impedance decreases with increasing applied voltage, associated with an inductive device which inductively couples different parallel circuits of a distribution system, or separately insulated circuits of a multiple winding generator so that, in the event of a substantial departure of the currents of the circuits of a distribution system or machine from a predetermined ratio, the voltages induced in the inductive device are limited to a safe value. The impedance which may be employed may be any of the several types known in the art but I preferably employ a resistance material of a dense, homogeneous, inorganic compound of a ceramic nature, for example, as described and claimed in United States Letters Patent No. 1,822,742, granted September 8, 1931, on an application of Karl B. McEachron, having a high resistance at normal voltage so that there is substantially no current flow therethrough, and having a decreased resistance at a predetermined high voltage so as to allow current to flow therethrough. In this embodiment resistors 21 and 22 are connected in parallel with the coils 18a and 19a, respectively, and are so designed that when a predetermined high voltage is induced in either of the reactor coils 18a or 19a, substantially all of the current flows through the resistors during the time the flux of the reactor is changing from negative to positive saturation and only enough current is allowed to pass through the coils of the reactor to effect the flux change without an excessive voltage rise. Although I have shown a resistor connected in parallel with each coil of the reactor, it is to be understood that an arrangement where a resistor of sufficient capacity is connected in parallel with one of the reactor coils is equally effective. In the event of a short circuit on bus section 3, which causes the switch 17a to move to a circuit interrupting position, the differential reactor will then act as a series transformer with the coil 19a acting as an open circuited secondary winding. At the instant the coil 19a is open circuited all of the current traversing the coil 18a is magnetizing. By connecting the resistors 21 and 22 across the coils 18a and 19a, the voltage induced in the coil 19a is so reduced that the voltage stress on the insulation of the winding 19a is maintained within safe limits while the generator winding 10 is still supplying energy to the bus section 2. It can thus be seen that a high voltage cannot be induced in the windings of the reactor when a particular generating circuit is isolated upon the occasion of a fault or short circuit, or whenever it is found desirable or necessary.

In Fig. 2 of the drawing, I have shown an embodiment of my invention wherein less resistance material is required than in the arrangement illustrated in Fig. 1. In this arrangement the resistor can be smaller as it does not have to carry continuously the current caused by a high induced voltage as in the embodiment of Fig. 1, where the resistors have to be designed for a higher temperature rise. The elements in this embodiment which are the same as shown in Fig. 1 are designated by the same reference numerals for purposes of simplifying the comparison of the two arrangements. In this embodiment suitable switches 16b and 17b, of the usual type of oil switch, are interposed between the buses 2 and 3 and inductive devices 14 and 15, respectively. The switches 16b and 17b are shown as of the latched-in type and are provided with trip coils 23 and 24 respectively. The trip coils 23 and 24 may be arranged in any suitable manner so that they are energized when a predetermined abnormal condition occurs on any of the generating circuits of the machine. Preferably the trip coils 23 and 24 are arranged to be energized in accordance with the amount of current flowing from the multiple winding generator to the bus sections 2 and 3 when the switches 16b and 17b are closed. As shown in Fig. 2, this result is obtained by connecting the trip coil 23 to the secondary winding of a current transformer 25 the primary winding of which is connected in series relation with the generator winding 10 when the switch 16b is closed. Similarly, the trip coil 24 is connected to the secondary winding of a current transformer 26 the primary winding of which is connected in series relation with the generator winding 11 when the switch 17b is closed.

In order that the differential reactor will not induce a high voltage in one of the coils 18b or 19b when either one of the switches 16b or 17b is moved to a circuit interrupting position, an arrangement is provided whereby the coil 19b is short circuited when either the switch 16b or 17b is in a circuit interrupting position. For this purpose I employ a switch 27 for example, of the usual type of oil switch, connected across the coil 19b. As shown in the drawing, the switch 27 is of the latched-out type and is provided with two trip coils 28 and 29, which are adapted to be energized by a suitable source of current as, for example, the control bus 30, through auxiliary contacts 31 and 32 of the switches 16b and 17b, respectively.

In the event of a short circuit on the bus section 2 with the switches 7 and 8 in the positions illustrated, the flow of fault current will energize the trip coil 23 to move the switch 16b to a circuit interrupting position. The opening of switch 16b will close auxiliary contacts 31 of the switch 16b and complete a circuit for the trip coil 28 to close the switch 27. When the switch 27 is moved to a circuit closing position, the coil 19b is short circuited and a high voltage cannot be induced in the open circuited coil 18b. In the interval of time, however, between the opening of the switch 16b and the closing of the switch 27 there is a tendency for a high voltage to be induced in the open circuited coil 18b. In order to prevent this high voltage from being induced in the coil 18b during this time interval, a resistor 33 having a negative impedance-voltage characteristic is connected across the coil 19b in parallel with the switch 27. This resistor 33 is designed so that it will carry enough of the current during the time the coil 18b is open circuited to prevent a high voltage from being induced therein. As soon as the switch 27 is in a closed position the coil 19b and resistor 33 are shunted so that energy is supplied directly to the bus section 3. Since the resistor 33 has to carry current only during a short interval of time, there is less heating and the amount of resistance required is much smaller than in the embodiment shown in Fig. 1.

In the event of a short circuit on the bus section 3 with the switches 7 and 8 in the positions illustrated, the flow of fault current will energize the trip coil 24 to move the switch 17b to a circuit interrupting position. The opening of the switch 17b will close the auxiliary contacts 32 of the switch 17b and complete a circuit for the trip coil 29 to close the switch 27. When the switch 27 is closed, the coil 19b is short circuited so that a high voltage cannot be induced therein while the generator winding 10 is still supplying energy to the bus section 2. In the interval of time between the opening of the switch 17b and the closing of the switch 27, the resistor 33 will carry enough of the current to prevent a high voltage from being induced in the coil 19b while it is open circuited.

As previously mentioned the utilization of a voltage reducing device, such as a resistance material having a negative impedance-voltage characteristic as specified, also serves the purpose of eliminating the extra duty which the differential reactor imposes on the circuit interrupting switches associated with the different generating circuits. When the circuit interrupting switches of one generator do not open simultaneously upon the occasion of a short circuit, without any voltage limiting device, a high voltage will be generated across the differential reactor, making it difficult for the first switch to clear. Referring to Fig. 1, this effect will be most serious when, in the event of a short circuit on bus section 3, switch 16a tries to open ahead of switch 17a. In this case, during the period that the core of the differential reactor is unsaturated, the normal recovery voltage appears across the winding 19a and also in the generating circuit associated with the generator winding 10. The voltage across winding 19a, however, also exists across winding 18a and in such a direction as to add to the voltage in the generating circuit associated therewith. As a result, the switch 16a suffers twice normal recovery voltage. By employing the resistance material, as shown at 21 and 22, this excessive voltage is reduced to prevent an increased duty on the circuit interrupting switches 16a and 17a.

While Figs. 1 and 2 show the preferred embodiments of my invention, it will readily occur to those skilled in the art that conditions may arise where it is desirable to eliminate the bus sectionalizing reactors and have the multiple winding generators themselves act to provide the necessary reactance. In such cases the bus sections may be connected together through separate insulated generator windings which are connected respectively to different bus sections and which interconnect the bus sections through the coupling effect of the two windings.

While I have shown and described particular embodiments of my invention, it will be obvious to those skilled in the art that changes and modifications may be made without departing from my invention and I therefore aim in the appended claims to cover all such changes and modifications as fall within the true scope of my invention.

What I claim as new and desire to secure by Letters Patent of the United States, is:—

1. In combination, a pair of electric circuits, a reactor for interconnecting said circuits having two windings with opposed magnetomotive forces connected respectively in different circuits of said pair of circuits, and a resistor having a negative impedance-voltage characteristic connected in parallel relation with one of said windings.

2. In combination, a source of alternating current comprising a plurality of separately insulated generating circuits, a distribution system connected to be energized from said circuits, inductive means coupling said circuits for maintaining a predetermined ratio of the currents of said circuits, and impedance means operatively associated with said inductive means for limiting to a safe value the voltages induced in said inductive means due to a departure of the currents of said circuits from said predetermined ratio.

3. In combination, a source of alternating current comprising a plurality of separately insulated generating circuits, a distribution system connected to be energized from said circuits, inductive means for interconnecting said generating circuits having inductively coupled windings in series relation with corresponding phases of said generating circuits for maintaining a predetermined ratio of the currents of said circuits, and impedance means having a negative impedance-voltage characteristic associated with said inductive means for limiting to a safe value the voltages induced in said inductive means due to a departure of the currents of said circuits from said predetermined ratio.

4. In combination, a source of alternating current comprising a plurality of separately insulated generating circuits, a distribution system connected to be energized from said circuits, inductive means for interconnecting said generating circuits having a plurality of windings in series, respectively, with corresponding phase windings of said generating circuits arranged so that for a predetermined distribution of the currents of said generating circuits the resultant magnetomotive force of said inductive means is substantially zero, and means having a negative impedance-voltage characteristic connected in parallel relation with said inductive means for limiting to a safe value the voltages induced in said windings due to a departure of the currents of said generating circuits from said predetermined distribution.

5. In combination, a source of alternating current comprising a plurality of separately insulated generating circuits, a distribution system connected to be energized from said generating circuits, inductive means for interconnecting said generating circuits having inductively coupled windings in series relation with corresponding phases of said generating circuits for maintaining a predetermined ratio of the currents of said circuits, and resistance means having a negative resistance-voltage characteristic connected in parallel to the windings of said inductive means for limiting to a safe value the voltages induced in said windings due to a departure of the currents of said generating circuits from said predetermined ratio.

6. In combination, an alternating current dynamo-electric machine having two separately insulated circuits, two distribution circuits each connected to a different circuit of said machine, a reactor for interconnecting said machine circuits having two windings with opposed magnetomotive forces connected, respectively, in series relation with corresponding phase windings of said separately insulated circuits, and a resistor having a negative impedance-voltage characteristic connected across each of said windings.

7. In combination, two distribution circuits, a source of alternating current comprising two separately insulated generating circuits each connected to supply electrical energy to a different distribution circuit, an inductive device interposed between said distribution circuits for interchanging power therebetween, inductive means coupling said generating circuits for maintaining a predetermined ratio of the currents of said generating circuits, and impedance means operatively associated with said inductive means for limiting to a safe value the voltages induced in said inductive means due to a departure of the currents of said generating circuits from said predetermined ratio.

8. In a system of distribution, a main distribution bus comprising a plurality of sections, a source of alternating current having a plurality of separately insulated generating circuits each connected to a different section, a differential reactor having a plurality of coils for interconnecting corresponding phases of said generating circuits, a plurality of normally closed switches associated with said generating circuits for isolating said generating circuits, and a circuit including resistance having a negative impedance-voltage characteristic associated with said reactor for limiting to a safe value the voltages induced in said coils due to the isolation of one of said generating circuits.

9. In combination, a source of alternating current comprising two separately insulated generating circuits, a distribution system connected to be energized from said generating circuits, inductive means for interconnecting said generating circuits having inductively coupled windings in series relation with corresponding phases of said generating circuits for maintaining a predetermined ratio of the currents of said generating circuits, normally closed switches associated with said generating circuits responsive to an abnormal flow of current in said distribution system for isolating said generating circuits, means responsive to the isolation of either of said generating circuits for short circuiting the windings of said inductive device associated with one of said generating circuits, and impedance means operatively associated with said windings adapted to be short circuited for limiting to a safe value the voltages induced in said inductive means during the interval of time between the isolation of either of said generating circuits and the short circuiting of said windings.

10. In combination, a source of alternating current comprising two separately insulated generating circuits, a distribution system connected to be energized from said circuits, inductive means for interconnecting said generating circuits having two windings in series, respectively, with corresponding phase windings of said generating circuits arranged so that for a predetermined distribution of the currents of said generating circuits the resultant magnetomotive force of said inductive means is substantially zero, normally closed switches associated with said generating circuits responsive to an abnormal flow of current in said distribution system for insolating said generating circuits, means responsive to the isolation of either of said generating circuits for short circuiting said windings in series with the phase windings of one of said generating circuits, and means having a positive non-linear volt-ampere characteristic in parallel relation with with said last mentioned means for limiting to a safe value the voltages induced in the windings of said inductive means during the interval of time between the isolation of either of said generating circuits and the short circuiting of said windings.

LEO H. PERRY.